(12) United States Patent
Geng et al.

(10) Patent No.: US 11,327,311 B2
(45) Date of Patent: May 10, 2022

(54) FIELD CURVATURE CORRECTED DISPLAY

(71) Applicant: Facebook Technologies, LLC, Menlo Park, CA (US)

(72) Inventors: Ying Geng, Bellevue, WA (US); Jacques Gollier, Sammamish, WA (US); Stephen James McNally, Sammamish, WA (US); Brett Joseph Bryars, Santa Rosa, CA (US); Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 239 days.

(21) Appl. No.: 16/738,770

(22) Filed: Jan. 9, 2020

(65) Prior Publication Data

US 2020/0150438 A1 May 14, 2020

Related U.S. Application Data

(62) Division of application No. 15/441,738, filed on Feb. 24, 2017, now Pat. No. 10,571,692.
(Continued)

(51) Int. Cl.
*G02B 27/28* (2006.01)
*G02B 27/01* (2006.01)
(Continued)

(52) U.S. Cl.
CPC ....... *G02B 27/0172* (2013.01); *G02B 6/0005* (2013.01); *G02B 6/0008* (2013.01);
(Continued)

(58) Field of Classification Search
CPC ........ G02B 5/30; G02B 5/3025; G02B 27/18; G02B 27/28; G02B 27/283; G02B 27/286;
(Continued)

(56) References Cited

U.S. PATENT DOCUMENTS 5,081,885 A   1/1992   Shaffer
5,181,013 A   1/1993   Bagshaw et al.
(Continued)

FOREIGN PATENT DOCUMENTS

EP   1096293 A2   5/2001
EP   1267197 A2   12/2002
(Continued)

OTHER PUBLICATIONS

The State Intellectual Property Office of People's Republic of China, Office Action, Chinese Patent Application No. 201780016203. 1, dated Jun. 19, 2020, 13 pages.
(Continued)

*Primary Examiner* — Arnel C Lavarias
(74) *Attorney, Agent, or Firm* — Fenwick & West LLP

(57) ABSTRACT

A head mounted display (HMD) includes a field curvature corrected (FC) display to mitigate field curvature in an image that is output to a user's eyes. The FC display includes elements that generate the image light and elements to mitigate field curvature from the image light. The FC display may include a display panel with lenses, a display panel with a reflective polarizer and reflective surface, or other optical elements. The FC display may include a pancake lens configuration including a polarized display with a quarter wave plate, a reflective mirror, and a polarization reflective mirror.

20 Claims, 11 Drawing Sheets

Related U.S. Application Data

(60) Provisional application No. 62/302,675, filed on Mar. 2, 2016.

(51) Int. Cl.
| | |
|---|---|
| *G02B 6/06* | (2006.01) |
| *G02B 6/08* | (2006.01) |
| *F21V 8/00* | (2006.01) |
| G02B 17/08 | (2006.01) |
| G02B 5/30 | (2006.01) |
| G02B 27/00 | (2006.01) |

(52) U.S. Cl.
CPC ............... *G02B 6/06* (2013.01); *G02B 6/08* (2013.01); *G02B 5/3083* (2013.01); *G02B 17/0812* (2013.01); *G02B 27/0025* (2013.01); *G02B 27/283* (2013.01); *G02B 2027/011* (2013.01); *G02B 2027/0132* (2013.01)

(58) Field of Classification Search
CPC .. G02B 27/288; G02B 27/01; G02B 27/0101; G02B 2027/011; G02B 2027/013; G02B 27/017; G02B 27/0172
USPC .... 359/489, 483.01, 487.01, 487.05, 488.01, 359/489.01, 489.07, 489.14, 489.15, 359/489.2, 629, 630, 631; 362/19; 353/20, 28, 39
See application file for complete search history.

(56) References Cited

U.S. PATENT DOCUMENTS

| | | | |
|---|---|---|---|
| 5,293,271 | A | 3/1994 | Merritt et al. |
| 5,581,271 | A | 12/1996 | Kraemer |
| 5,757,544 | A | 5/1998 | Tabata et al. |
| 5,853,240 | A | 12/1998 | Tanaka |
| 5,949,583 | A | 9/1999 | Rallison et al. |
| 6,215,593 | B1 | 4/2001 | Bruce |
| 7,136,228 | B2 | 11/2006 | Tanijiri |
| 8,009,949 | B1 | 8/2011 | Peng et al. |
| 9,829,616 | B2 | 11/2017 | Yun et al. |
| 2001/0043163 | A1 | 11/2001 | Waldern et al. |
| 2005/0286135 | A1 | 12/2005 | Weissman et al. |
| 2007/0018124 | A1 | 1/2007 | Nishi |
| 2007/0070508 | A1 | 3/2007 | Ruhle et al. |
| 2011/0164294 | A1* | 7/2011 | Shimizu ............. G02B 27/0172 359/13 |
| 2012/0057129 | A1 | 3/2012 | Durnell et al. |
| 2012/0119978 | A1 | 5/2012 | Border et al. |
| 2014/0266990 | A1 | 9/2014 | Makino et al. |
| 2015/0370074 | A1 | 12/2015 | McDowall et al. |
| 2015/0378074 | A1 | 12/2015 | Kollin et al. |
| 2017/0068096 | A1 | 3/2017 | Ouderkirk et al. |
| 2017/0161951 | A1 | 6/2017 | Fix et al. |
| 2018/0149862 | A1 | 5/2018 | Kessler |

FOREIGN PATENT DOCUMENTS

| | | |
|---|---|---|
| EP | 1471375 A1 | 10/2004 |
| JP | H06-319092 A | 11/1994 |
| JP | H07-175009 A | 7/1995 |
| JP | H07-193827 A | 7/1995 |
| JP | H 09182112 A | 7/1997 |
| JP | H11-153772 A | 6/1999 |
| JP | 2008-176092 A | 7/2008 |
| JP | 2009-014962 A | 1/2009 |
| JP | 2009-157399 A | 7/2009 |
| JP | 2013-045020 A | 3/2013 |
| WO | WO-1995024713 A1 | 9/1995 |
| WO | 9607947 A1 | 3/1996 |
| WO | WO-2001002893 A1 | 1/2001 |
| WO | WO 2015/196965 A1 | 12/2015 |
| WO | WO 2016/027539 A1 | 2/2016 |

OTHER PUBLICATIONS

International Preliminary Report on Patentability for Application No. PCT/US2017/020261, dated Sep. 13, 2018, 13 Pages.
Notice of Preliminary Rejection dated Jul. 21, 2021 for Korean Application No. 2018-7025881, filed Mar. 1, 2017, 15 pages.
European Patent Office, European Partial Search Report, European Patent Application No. 17760743.9, dated Feb. 12, 2019, 15 pages.
European Patent Office, European Search Report and Opinion, European Patent Application No. 17760743.9, dated Jun. 24, 2019, 19 pages.
PCT International Search Report and Written Opinion, PCT Application No. PCT/US2017/020261, dated May 15, 2017, 17 pages.
United States Office Action, U.S. Appl. No. 15/441,738, dated Aug. 14, 2019, 11 pages.
United States Office Action, U.S. Appl. No. 15/712,003, dated Jan. 14, 2020, 20 pages.
The Japan Patent Office, Office Action, Japanese Patent Application No. 2018-545961, dated Jan. 5, 2021, 22 pages.

* cited by examiner

FIELD CURVATURE CORRECTED DISPLAY

RELATED APPLICATIONS

This application is a division of co-pending U.S. application Ser. No. 15/441,738, filed Feb. 24, 2017, which claims the benefit of U.S. Provisional Patent Application No. 62/302,675, filed on Mar. 2, 2016, each of which is incorporated by reference in its entirety herein.

BACKGROUND

The present disclosure generally relates to correcting for optical aberrations, and specifically relates to correcting for pupil swim.

In a head-mounted display (HMD) a user's eye occupies a region of space generally referred to as an eyebox (typically there is a respective eyebox for a left and a right eye of the user). The HMD displays and directs content to the eyeboxes. But as a user moves their eye within an eyebox and/or the position of the HMD changes relative to the position of the user's head, the location of the user's eye within an eyebox may change. Changes in the location of the eye within an eyebox may result in distortions in the content being presented to the user. This effect is known as pupil swim, and it can be a problem for HMDs for various reasons including, e.g., increased calibration difficulty, and motion sickness due to problems with vertical disparity. Conventional approaches for reducing pupil swim add complexity to HMDs. For example, one solution includes an eye tracking unit that continually recalibrates the HMD with a pupil location.

SUMMARY

A HMD includes a field curvature corrected (FC) display that mitigates field curvature in an image that is output to a user's eyes. The FC display includes elements that generate image light and elements that mitigate field curvature from the image light.

In one embodiment, the FC display includes a display block and an optics block configured to optically direct image light corrected for field curvature to an exit pupil of the HMD, at least one of the display block and the optics block optically corrects the image light for field curvature.

In some embodiments, the display block includes an electronic display panel, and the FC display further comprises a fiber taper including a mounting surface and a display surface. The mounting surface is formed to and affixed to the surface of the electronic display panel to receive the image light from the electronic display panel. The display surface has a shape configured to output the image light corrected for field curvature in the image light received from the electronic display panel.

In some embodiments, the display block includes a projector and a diffuser configured to receive the image light from the projector, the diffuser having a shape configured to output the image light corrected for field curvature.

In some embodiments, the display block includes an electronic display panel, a reflective surface of the electronic display panel, and a quarter wave plate on a surface of the electronic display panel, and the FC display further comprises a reflective polarizer, the reflective polarizer having a shape configured to output image light corrected for field curvature in the image light received from the electronic display panel. The reflective polarizer may be configured to reflect the image light of one polarization that is emitted from the electronic display panel and to transmit the image light of another polarization that is reflected from a reflective surface of the electronic display panel and passes through the quarter wave plate on the surface of the electronic display panel.

In some embodiments, the display block includes an electronic display panel and a reflective surface of the electronic display panel, and the FC display further comprises a quarter wave plate and a reflective polarizer, the reflective polarizer having a shape configured to output image light corrected for field curvature in the image light received from the electronic display panel. The reflective polarizer is configured to reflect the image light of one polarization that is emitted from the electronic display panel and passes through the quarter wave plate, transmit the image light of another polarization that is reflected from the reflective surface of the electronic display panel on the surface of the electronic display panel and passes through the quarter wave plate.

In some embodiments, the display block comprises a transparent electronic display panel, a quarter wave plate, a reflector, and the FC display further comprises a reflective polarizer, the reflective polarizer having a shape configured to output image light corrected for field curvature in the image light received from the transparent electronic display panel. The reflective polarizer is configured to reflect the image light of one polarization that is emitted from the transparent electronic display panel, transmit the image light of another polarization that is reflected from the reflector and passes through the quarter wave plate.

In some embodiments, the HMD comprises a FC display including an electronic display panel that outputs image light, a linear polarizer configured to linearly polarize the image light, and a pancake lens assembly. The pancake lens assembly comprises a first optical element and a second optical element. The first optical element includes a first waveplate surface and a first mirrored surface. The first waveplate surface is a quarter waveplate configured to receive light from the linear polarizer and shift a polarization of the image light. The first mirrored surface is a partially reflective mirror that is configured to transmit a portion of the image light. The second optical element includes a second waveplate surface and a second mirrored surface. The second waveplate surface is a quarter waveplate configured to receive the image light from the first optical element and shift a polarization of the image light transmitted by the second waveplate surface. The second mirrored surface is a polarized reflector and is configured to reflect image light of a first polarization toward the second waveplate surface and transmit image light of a second polarization that is corrected for field curvature to an exit pupil of the HMD corresponding to a location of an eye of a user of the HMD. One or more surfaces of the first optical element and the second optical element may have a shape configured to output the image light corrected for field curvature in the image light received from the display panel. This shape may be spherically concave. The first mirrored surface may have a first radius of curvature and the second mirrored surface has a second radius of curvature that is within a threshold range of the first radius of curvature.

In some embodiments, a head mounted display (HMD) includes a field curvature corrected (FC) display including a display block configured to output image light and an optics block configured to optically direct image light corrected for field curvature to an exit pupil of the HMD corresponding to a location of an eye of a user of the HMD. The display block includes an electronic display panel and the FC display further includes a first lens and a second lens. The first lens may be a doublet comprising two parts, wherein one of the two parts is a negative element. The optics block may be made of two different types of plastic.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Field curvature is an optical aberration that causes a flat object to appear sharp only in a certain part(s) of the frame, instead of being uniformly sharp across the frame. More generally, field curvature is a result of a focal distance of an optics system not perfectly aligning with all the points on a focal plane. This is particularly a problem for flat panel displays since optics that transmit light emitted from flat electronic display panels may introduce field curvature errors into the transmitted light.

Pupil swim is the effect when changes in the location of a user's eye within an eyebox results in distortions in the content being presented to the user. Correcting for field curvature mitigates pupil swim. A field curvature corrected display is part of a head-mounted display (HMD). The HMD may be part of, e.g., a virtual reality ("VR") and/or augmented reality ("AR") system environment. The field curvature corrected (FC) display mitigates field curvature in an image that is output to a user's eyes to reduce pupil swim. The FC display generally includes elements that generate the image light and elements that mitigate field curvature from the image light. For example, the FC display may include an electronic display panel with lenses, an electronic display with a fiber taper, a projector with a curved diffuser, an electronic display panel with a reflective polarizer and a reflective surface, or other optical elements that are configured to mitigate field curvature. In some embodiments, the FC display may have a pancake lens configuration which includes polarized display with a quarter wave plate, a reflective mirror, and a polarization reflective mirror.

System Overview

Figure 1:
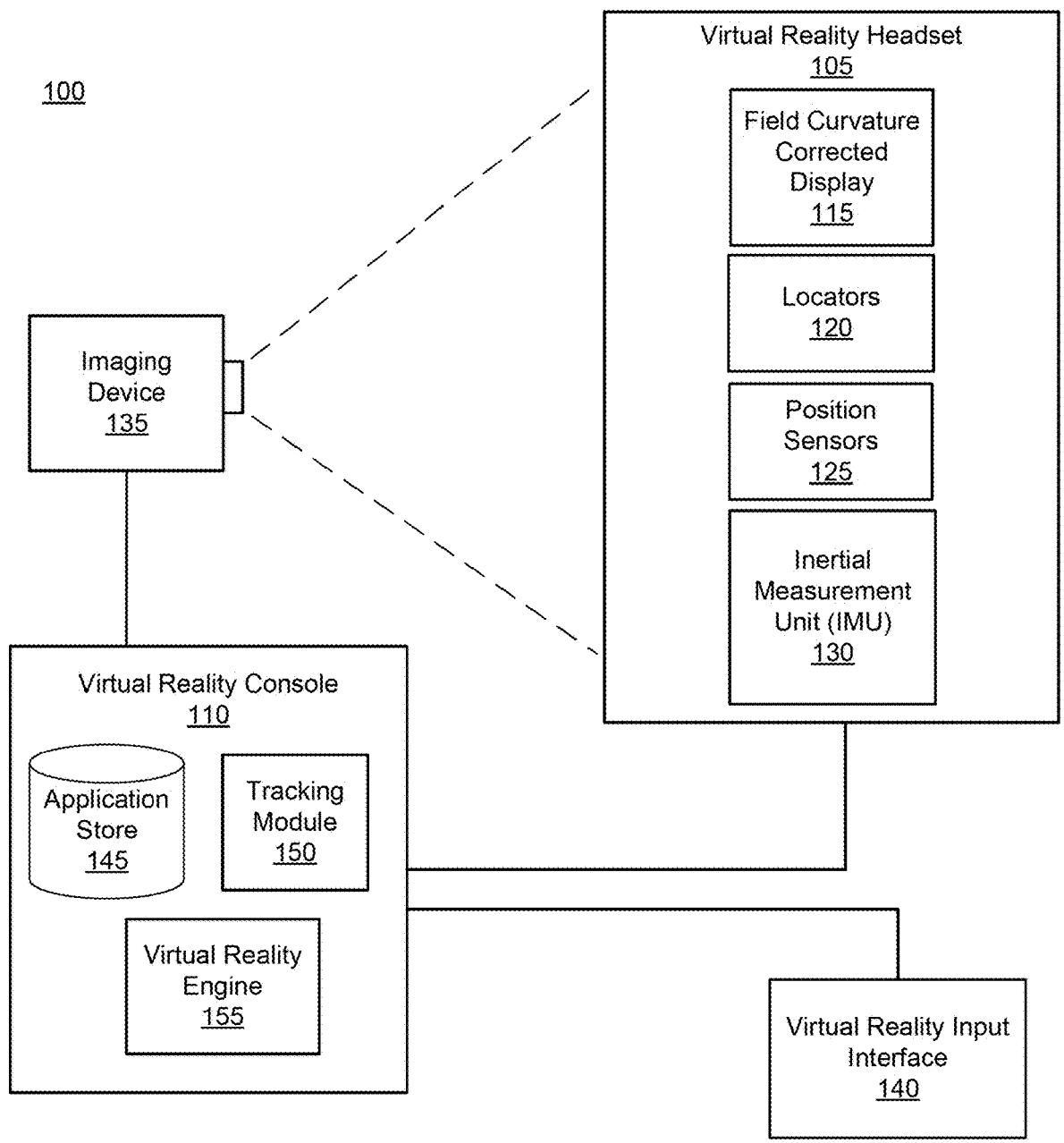
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100. Additionally, in some embodiments the VR system 100 may be modified to include other system environments, such as an AR system environment.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an AR headset. In these embodiments, the VR headset 105 augments views of a physical, real-world environment with computer-generated elements (e.g., images, video, sound, etc.).

The VR headset 105 includes a field curvature corrected (FC) display 115, one or more locators 120, one or more position sensors 125, and an inertial measurement unit (IMU) 130.

The FC display 115 displays images to the user in accordance with data received from the VR console 110. In some embodiments, the FC display 115 includes a display block and an optics block. The display block includes an electronic display (e.g., OLED), and the optics block includes one or more optical elements that transmit images from the display block to eyes of the user. In some embodiments, some or all of the functionality of the display block is part of the optics block or vice versa. As described in detail below with regard to FIGS. 2B-7, the blocks of the FC display 115 are configured to mitigate field curvature. For example, the FC display 115 may include a fiber taper coupled to an electronic display, whose shape is such that image light output from the fiber taper is corrected for field curvature. In another embodiment, the FC display 115 is a projector with a diffuser, the diffuser having a shape (e.g., curved) such that the output light is corrected for field curvature. The FC display 115 may correct for pupil swim via a different configurations. Specific configurations of possible FC displays are discussed below with regard to FIGS. 3-7.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retroreflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. The tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
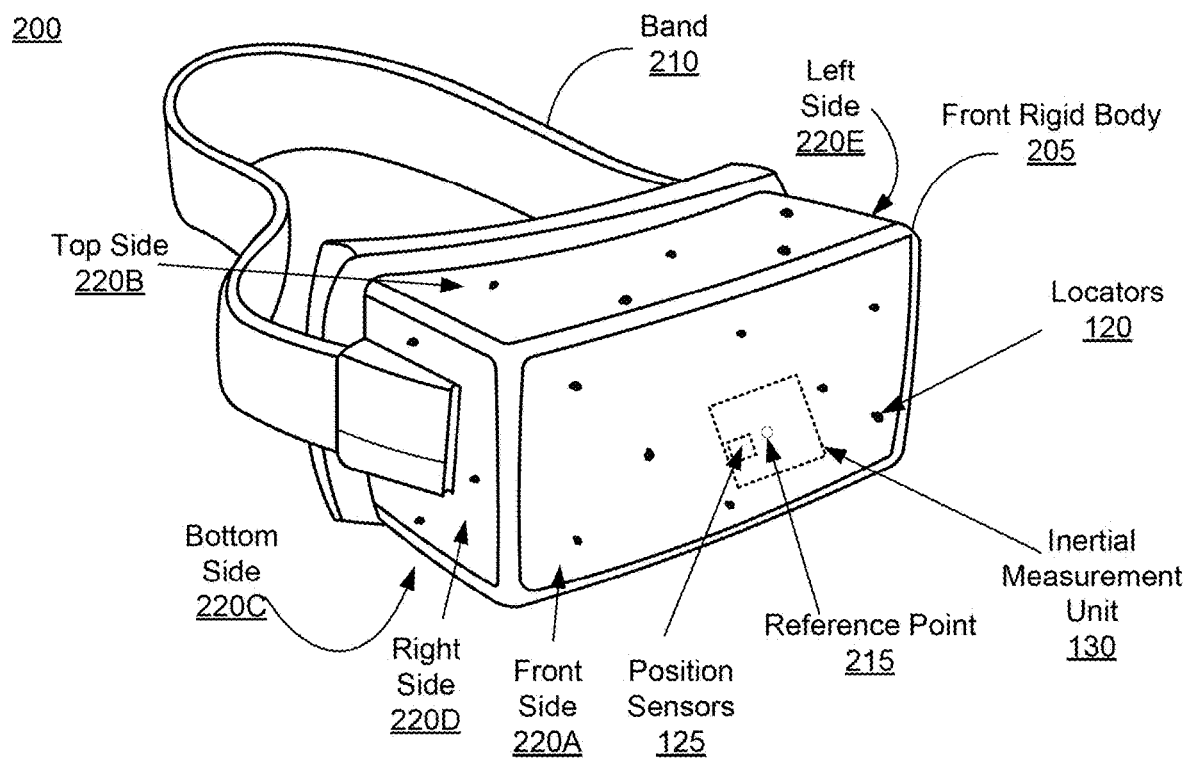
FIG. 2A is a diagram of a virtual reality headset, in accordance with an embodiment.

FIG. 2A is a diagram of a virtual reality (VR) headset 200, in accordance with an embodiment. The VR headset 200 is an embodiment of the VR headset 105, and includes a front rigid body 205 and a band 210. The front rigid body 205 includes one or more electronic display elements of the field curvature corrected display 115 (not shown in FIG. 2A), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A. Note that the VR headset 200 may be modified to work as an AR headset.

Figure 2B:
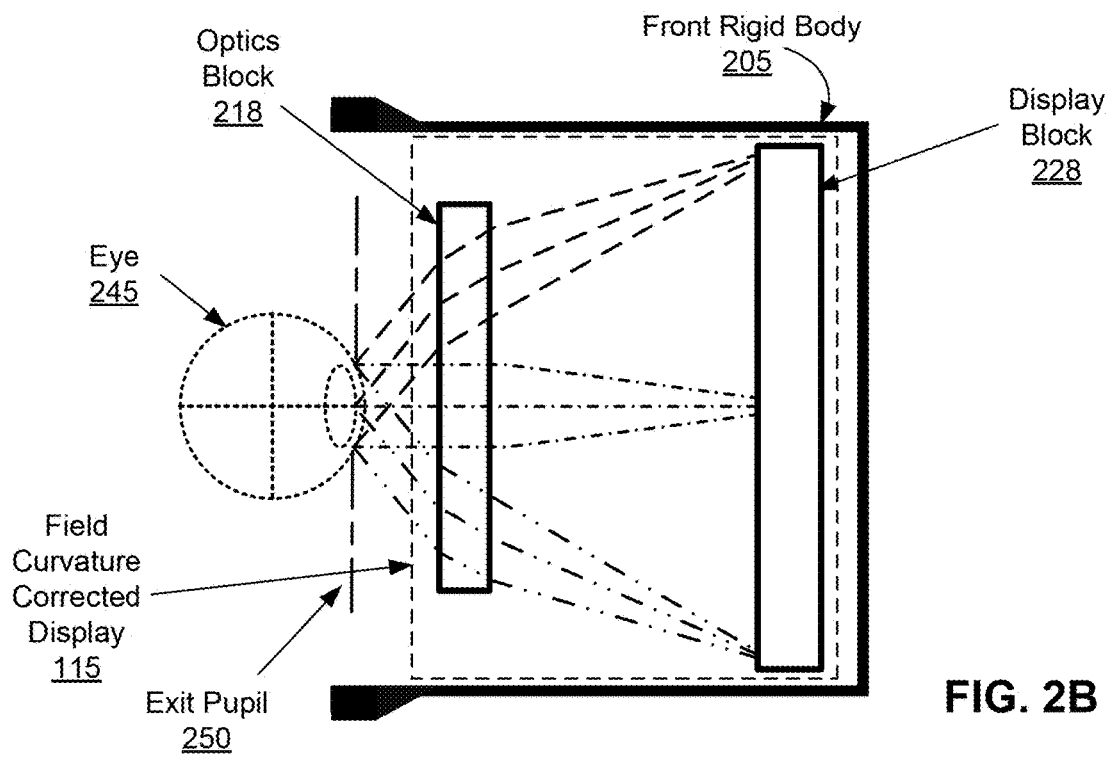
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes the FC display 115 that provides altered image light to an exit pupil 250. The FC display 115 includes a display block 228 and an optics block 218. The exit pupil 250 is the location of the front rigid body 205 where a user's eye 245 is positioned. For purposes of illustration, FIG. 2B shows a cross section 225 associated with a single eye 245, but another FC display, separate from the FC display 115, provides altered image light to another eye of the user.

The display block 228 generates image light. In some embodiments the light is corrected for field curvature and/or other aberrations. The FC display 115 displays images to the user in accordance with data received from the VR console 110. In various embodiments, the FC display 115 may comprise a single electronic display or multiple electronic displays (e.g., a display for each eye of a user). Examples of the electronic display include: a liquid crystal display (LCD), an organic light emitting diode (OLED) display, an active-matrix organic light-emitting diode display (AMOLED), a transparent organic light emitting diode display (TOLED), some other display, a projector, or some combination thereof. The FC display 115 may also include display block optical elements for minimizing pupil swim. A display block optical element may be an aperture, a Fresnel lens, a convex lens, a concave lens, a filter, a polarizer, a diffuser, a fiber taper, or any other suitable optical element that affects the image light emitted from the electronic display. In some embodiments, one or more of the display block optical elements may have one or more coatings, such as anti-reflective coatings.

The optics block 218 magnifies received light from the display block 228, corrects optical aberrations associated with the image light, and the corrected image light is presented to a user of the VR headset 105. An optical element may be an aperture, a Fresnel lens, a convex lens, a concave lens, a filter, or any other suitable optical element that affects the image light emitted from the display block 228. Moreover, the optics block 218 may include combinations of different optical elements. In some embodiments, one or more of the optical elements in the optics block 218 may have one or more coatings, such as anti-reflective coatings. Magnification of the image light by the optics block 218 allows elements of the display block 228 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the optics block 218 is designed so its effective focal length is larger than the spacing to the display block 228, which magnifies the image light projected by the display block 228. Additionally, in some embodiments, the amount of magnification may be adjusted by adding or removing optical elements.

The display block 228 and the optics block 218 may take on different configurations within the FC display 115. The different configurations are discussed below with regard to FIGS. 3A-7B.

Figure 3A:
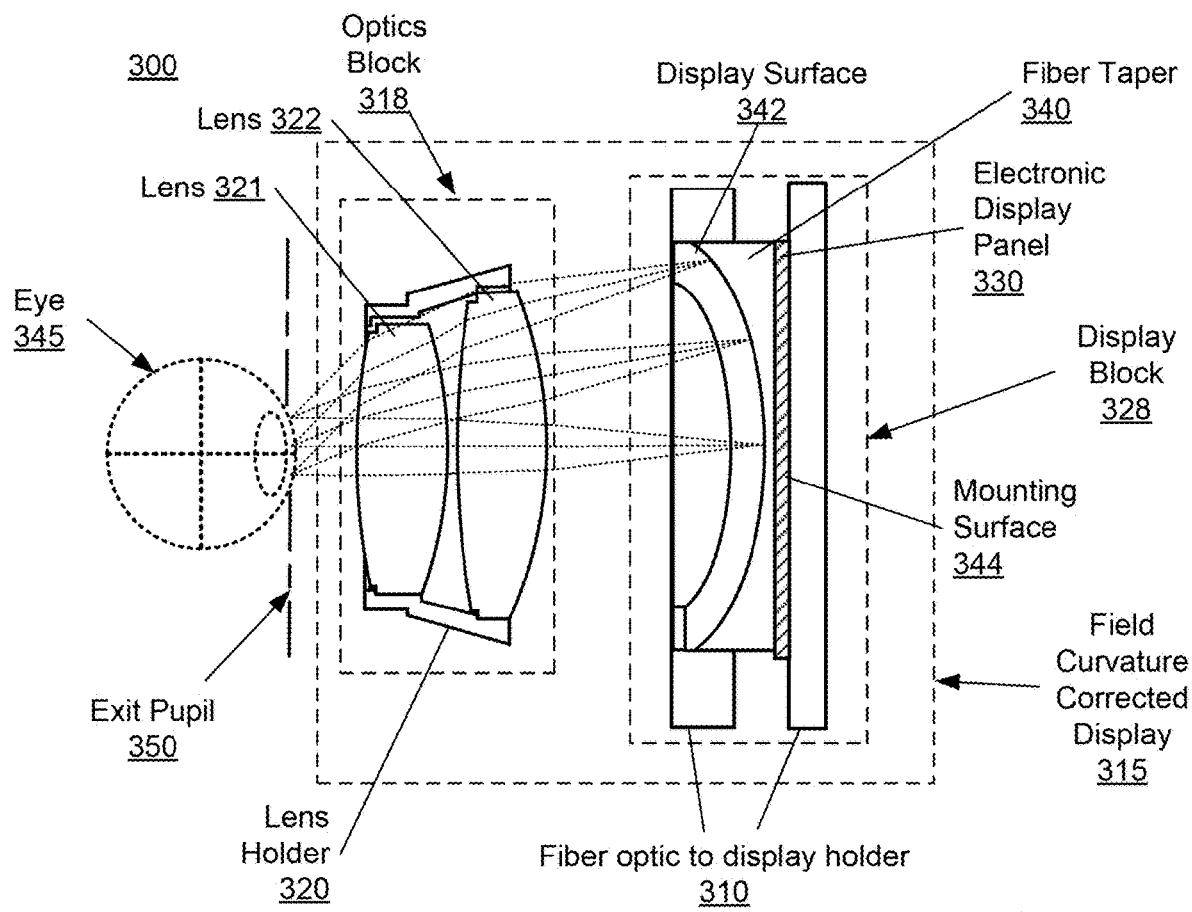
FIG. 3A is a cross section of a field curvature corrected (FC) display including a fiber taper, in accordance with an embodiment.

FIG. 3A is a cross section 300 of a FC display 315, in accordance with an embodiment. In some embodiments, the FC display 315 is part of the FC display 115 of the VR headset 105. In other embodiments it is part of some other electronic display, e.g., AR display, HMD, VR display, digital microscope, etc. The FC display 315 includes a display block 328 and an optics block 318. The FC display 315 corrects for field curvature (and thereby mitigates pupil swim) by emitting the image light in shape that, for example, coincides with a focal plane of the optical system (e.g., optics block 318). The exit pupil 350 is the location where a user's eye 345 is positioned. For purposes of illustration, FIG. 3A shows a cross section of a FC display 315 associated with a single eye 345, but another FC display, separate from the FC display 315, provides altered image light to another eye of the user. Some embodiments of the FC display 315 have different components than those described here. Similarly, in some cases, functions can be distributed among the components in a different manner than is described here. The display block 328 includes an electronic display panel 330 and a fiber taper 340. The electronic display panel 330 presents visual information from an electronic signal. Examples of the electronic display panel 330 include: a liquid crystal display (LCD), an organic light emitting diode (OLED) display, an active-matrix organic light-emitting diode display (AMOLED), some type of flexible display, or some combination thereof.

The fiber taper 340 is a tapered fiber optics plate. A fiber optics plate is made from a bundle of optical fibers, and directly shows light from its input surface to its output surface. A tapered fiber optics plate is typically made using heat treatment on a fiber optics faceplate, and changes the size ratio of the input surface to the output surface. A fiber taper may be used to enable the magnification of the electronic display panel 330, and the display surface 342 of the fiber taper 340 can be polished to be a curved display surface similar to a fiber optics faceplate.

A mounting surface 344 of the fiber taper 340 is formed to, and affixed to a surface of the electronic display panel 330. The fiber taper 340 includes a plurality of optical fibers that receive light from the display panel 330 through the mounting surface 344 and output the received light via the display surface 342 whose shape is such that the outputted image light is corrected for field curvature. In this embodiment, the display surface 342 is shaped to be spherically concave (e.g., a portion of a sphere). However, in other embodiments, the display surface 342 may be spherically convex, a rotationally symmetric sphere, an asphere, a freeform shape, or some other shape that mitigates field curvature and other optical aberrations. In some embodiments, the shape of the display surface 342 may designed to additionally correct for other forms of optical aberration, for example field-dependent aberrations.

In this embodiment, the electronic display panel 330 has a flat surface, accordingly, the mounting surface 344 of the fiber taper 340 is also flat. Alternatively, although not shown, the electronic display panel 330 may be cylindrically curved or have some other shape. The mounting surface 344 is formed to coincide with the surface of the electronic display panel 330, such that mounting surface 344 of the fiber taper 340 is affixed to the surface of the electronic display panel 330. For example, if the electronic display panel surface is flat, the mounting surface 344 is flat, if the electronic display panel surface is cylindrically convex, the mounting surface 344 is cylindrically concave, etc. The electronic display panel 330 and the mounting surface 344 may be coupled so that there is no air gap or separation between the mounting surface 344 and the cover glass of the electronic display panel, preventing the light coming out of the display from diverging and mixing with neighboring pixels (optical cross talk) before entering the fiber taper 340. In one embodiment, the cover glass of the electronic display panel 330 is a fiber optic faceplate, which may be used in combination with the fiber taper 340 to help prevent optical cross talk of light exiting the display panel 330 before entering the fiber taper 340. In another embodiment, the cover glass of the electronic display panel 330 is a piece of sealing film with thickness less than the pixel pitch to reduce optical cross talk of light exiting the display panel 330 before entering the fiber taper 340. In addition, the diameter of the fibers in the fiber taper 340 are the same size or smaller than the pixel pitch of the electronic display panel 330 to prevent mixing light from neighboring pixels. One advantage of this embodiment of using a fiber taper to correct for field curvature is the ability to use a flat panel display with this technique. Flat panel displays are generally cheaper and easier to fabricate than curved displays.

In another embodiment, although not shown in FIG. 3A, the fiber taper 340 can be a fiber optic faceplate, and the electronic display panel 330 can be a curved display. In another embodiment, the cover glass of the electronic display panel 330 may be a fiber optic faceplate that replaces the fiber taper 340. This fiber optic faceplate does not need to provide a magnification or image size change, but it may change the shape of the image plane. The shape may be determined by the net field curvature generated from the optics block 318. For example, if the optics block 318 consists of positive refractive lens elements, the field curvature from these elements generates a concave image plane, and the surface of the fiber optic faceplate can be shaped to create a concave image plane to compensate for the field curvature generated by the optics block 318. In a different example, if the optics block 318 consists of reflective positive lens elements, the field curvature from these elements generates a convex image plane, and the surface of the fiber optic faceplate can be shaped accordingly to compensate. The numerical aperture of the fiber optics faceplate is sized such that the eye box can be filled after light is refracted at the interface between air and the fiber optics faceplate, and through the optics block 318.

The optics block 318 magnifies received light from the display block and corrects optical aberrations associated with the image light. The optics block 318 has the same functionality of the optics block 218. The optics block 318 is made of lens 321 and lens 322 that are coupled by a lens holder 320. The lenses in the optics block 318 may have one or more coatings, such as anti-reflective coatings.

Figure 3B:
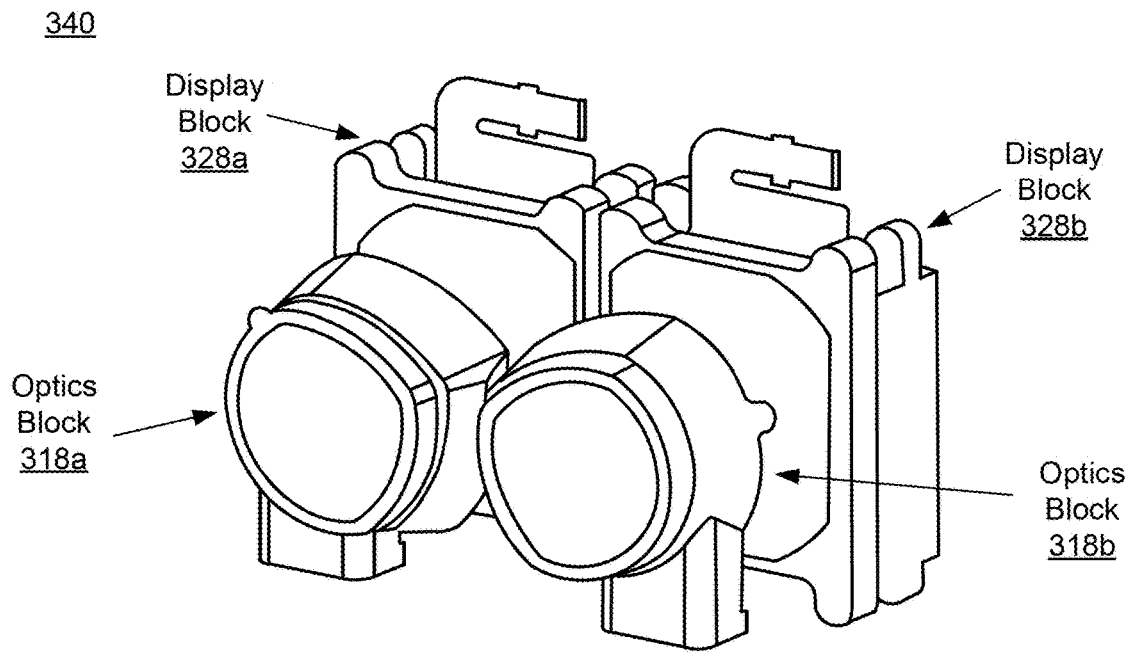
FIG. 3B is a display assembly of two FC displays including a fiber taper, in accordance with an embodiment.

FIG. 3B is a perspective view of a display assembly 340 including the FC display 315 shown in FIG. 3A, in accordance with an embodiment. In this embodiment, the FC display assembly 340 is made of two FC display elements 315, a display for each eye of a user. The FC display assembly 340 includes two display blocks 328a and 328b and two corresponding optics blocks 318a and 318b, which are the same as the display block 328 and optics block 318 as shown in FIG. 3A.

Figure 4:
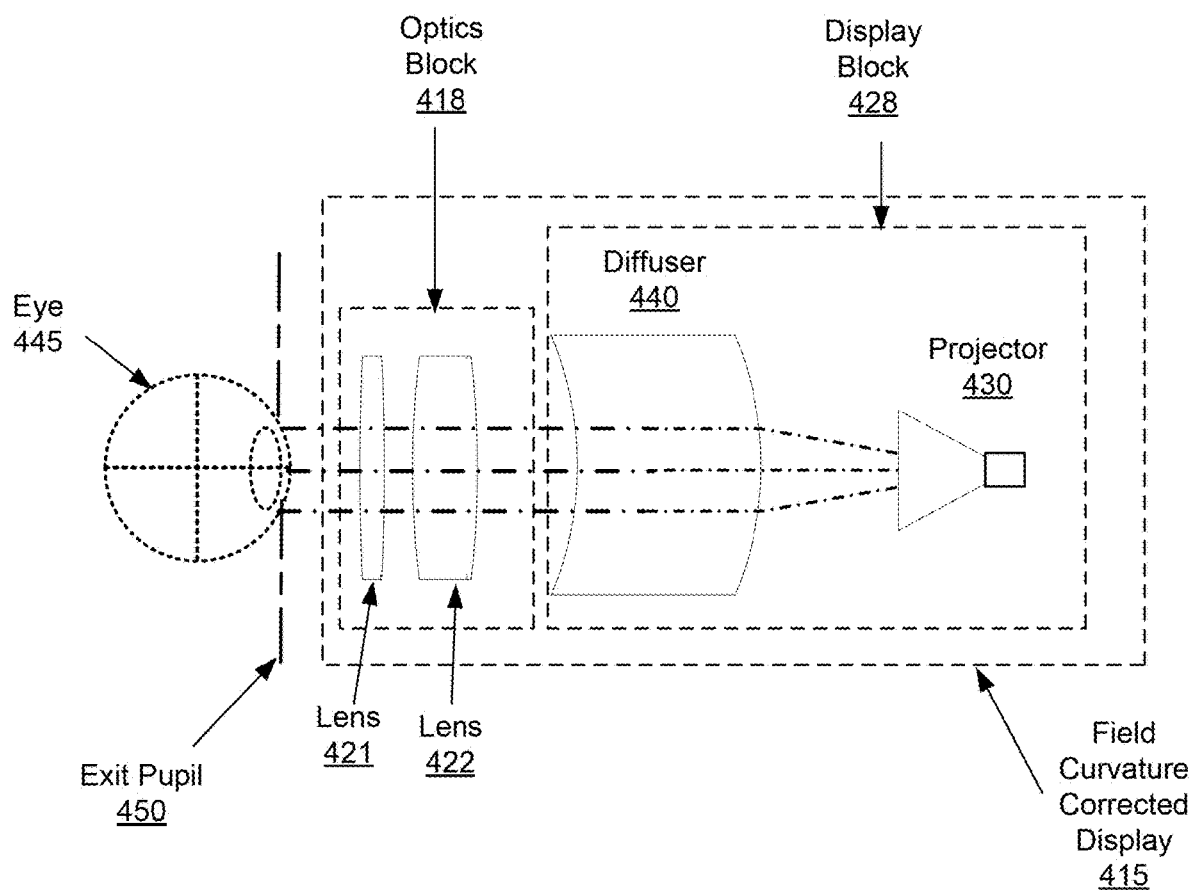
FIG. 4 is a cross section of a FC display including a projector and diffuser, in accordance with an embodiment.

FIG. 4 is a cross section 400 of an embodiment of a FC display 415 that includes a projection based display block 428, in accordance with an embodiment. In some embodiments, the FC display 415 is part of the FC display 115 of the VR headset 105. In other embodiments it is part of some other electronic display, e.g., AR display, HMD, VR display, digital microscope, etc. The FC display 415 includes a display block 428 and an optics block 418. The FC display 415 corrects for field curvature by having the display block 428 emit image light in a curved plane that coincides with a curved focal plane of the optical system (e.g., optics block 418). The exit pupil 450 is the location where a user's eye 445 is positioned. For purposes of illustration, FIG. 4 shows a cross section of a FC display 415 associated with a single eye 445, but another FC display, separate from the FC display 415, provides altered image light to another eye of the user. Some embodiments of the FC display 415 have different components than those described here. Similarly, in some cases, functions can be distributed among the components in a different manner than is described here.

The display block 428 includes a projector 430 and a diffuser 440. The projector 430 may be a laser projector, a pico projector, or other type of projector such as those using digital mirror devices (DMD). The diffuser 440 diffuses the projected light from the projector 430. The shape of the diffuser 440 is such that the outputted image light is along a curved image plane that corresponds to the focal plane of the optics block 418 and is accordingly corrected for field curvature. In this embodiment, the diffuser 440 is shaped to be spherically concave (e.g., a portion of a sphere). However, in other embodiments, the diffuser 440 may be spherically convex, a rotationally symmetric sphere, a freeform shape, or some other shape that mitigates field curvature. In some embodiments, the shape of the diffuser 440 may designed to additionally correct for other forms of optical aberration. The grain size of the diffuser 440 may have a grain size an order of magnitude smaller than the pixel pitch to avoid having dirty screen artifacts when viewed by the viewer, for example when used in the VR headset 105. In this embodiment, the projector 430 is positioned behind the diffuser 440 relative to the user's eye 445. In an alternate embodiment, although not shown, the projector 430 could be positioned in front of the diffuser 440 relative to the user's eye 445, and the diffuser 440 could be a reflective surface.

The optics block 418 is similar to the optics block 318 of FIG. 3A. The optics block 418 contains two lenses, lens 421 and lens 422. These lenses could be coupled by a lens holder, although not shown in the figure. The optics block magnifies received light from the display block and corrects optical aberrations associated with the image light.

Figure 5A:
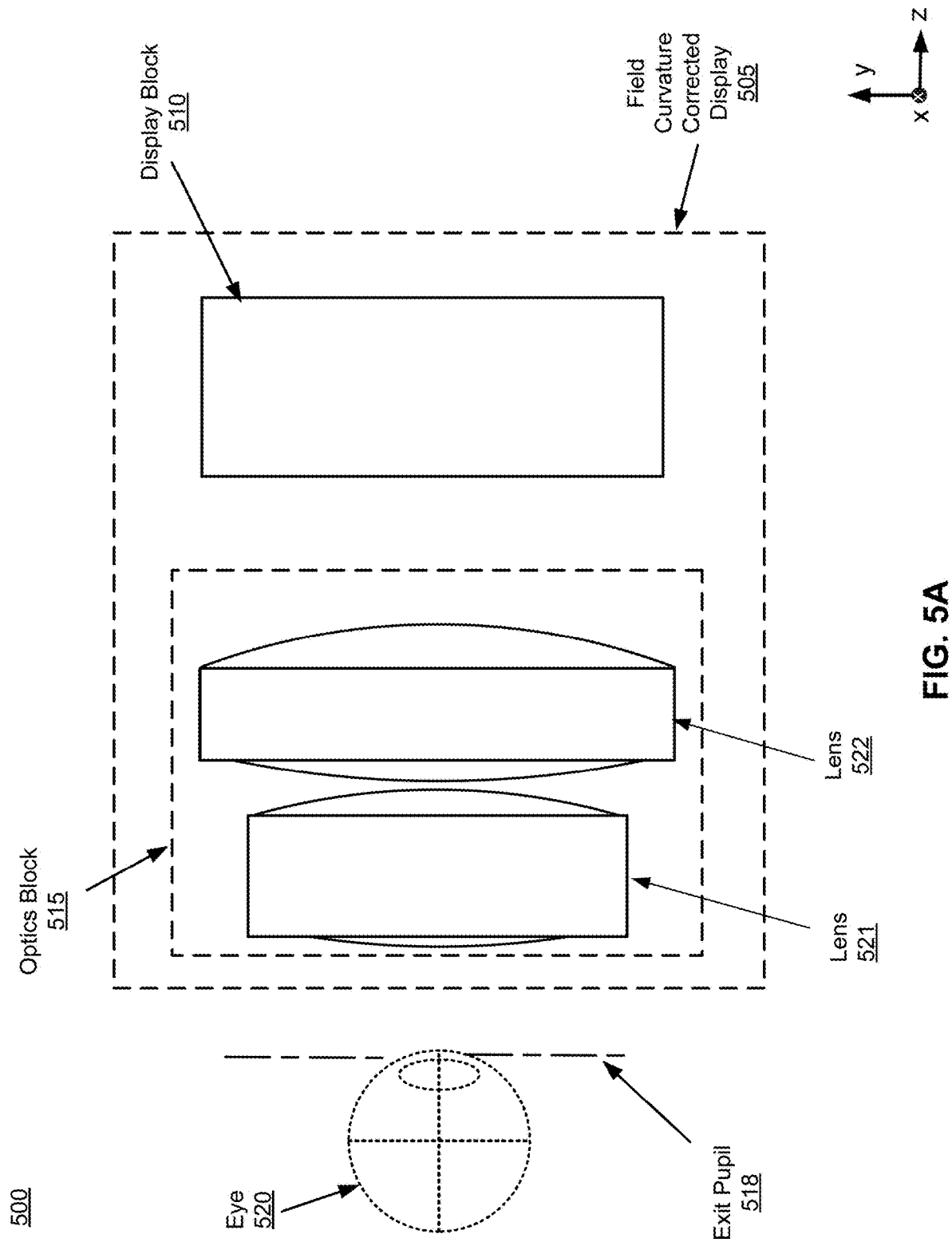
FIG. 5A is a cross section of a FC display including a curved reflective polarizer, in accordance with an embodiment.

FIG. 5A is a cross section 500 of an embodiment of a FC display 505 including a curved reflective polarizer, in accordance with an embodiment. In some embodiments, the FC display 505 is part of the FC display 115 of the VR headset 105. In other embodiments it is part of some other electronic display, e.g., an AR display, a HMD, a VR display, a digital microscope, etc. The FC display 505 includes a display block 510 and an optics block 515. The exit pupil 518 is the location where a user's eye 520 is positioned. For purposes of illustration, FIG. 5A shows a cross section of a FC display 505 associated with a single eye 520, but another FC display, separate from the FC display 505, provides altered image light to another eye of the user. Some embodiments of the FC display 505 have different components than those described here. Similarly, in some cases, functions can be distributed among the components in a different manner than is described here.

The display block 510 emits light corrected for field curvature. The display block 510 may include an electronic display panel, a reflective polarizer, one or more quarter wave plates, one or more specular reflectors, one or more linear polarizers, or some combination thereof. In some embodiments, the electronic display panel is partially reflective, the panel being reflective in regions outside of the pixel area, e.g. black matrix or regions of the display that do not emit light. In other embodiments, the electronic display panel can be a transparent electronic display panel. A transparent electronic display panel may be, for example, a transparent organic light emitting diode display (TOLED), some other transparent electronic display, or some combination thereof.

The reflective polarizer is a curved optical element shaped to correct for field curvature and polarize light. The reflective polarizer may be configured to reflect light that is linearly polarized in the x direction, and pass light that is linearly polarized in the y direction (or vice versa). The reflective polarizer may be shaped to be spherically concave (e.g., a portion of a sphere) to provide negative Petzval curvature. However, in other embodiments, the reflective polarizer may be spherically convex, a rotationally symmetric asphere, a freeform shape, or some other shape that mitigates field curvature. In some embodiments, the shape of the reflective polarizer may be designed to additionally correct for other forms of optical aberration. The function of the reflective polarizer element is discussed in detail below with regard to FIGS. 5B-5D.

One or more quarter wave plate elements are included in the display block 510. A quarter wave plate includes a polarization axis. The polarization axis is shifted 45 degrees (or 90 degrees) relative to they direction (which is the direction of the linearly polarized light of a perpendicular direction). Likewise, the quarter wave plate converts circularly polarized light into linearly polarized light. The orientation of the quarter wave plate axis relative to the incident linearly polarized light controls the handedness (clockwise or anti-clockwise) of the emitted circularly polarized light. The function of the quarter wave plate element is discussed in detail below with regard to FIGS. 5B-5D.

The optics block 515 is similar to the optics block 318 of FIG. 3A. The optics block 515 contains two lenses, lens 521 and lens 522. These lenses could be coupled by a lens holder, although not shown in the figure. The optics block magnifies received light from the display block 510 and corrects optical aberrations associated with the image light. The number of lens elements and the lens design (shape, refractive/reflective, material, refractive/diffractive) in the optics block can vary.

Figure 5B:
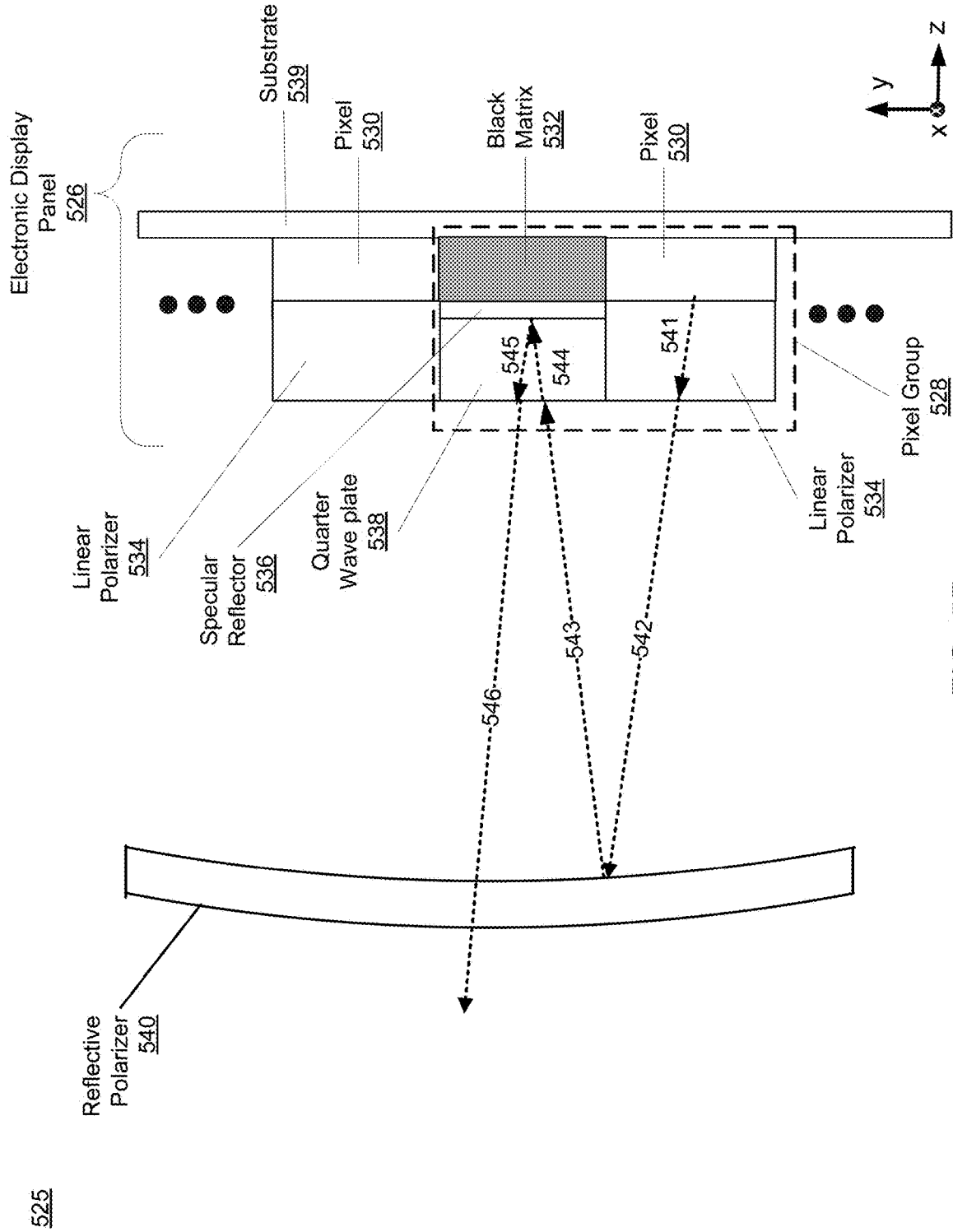
FIG. 5B is a cross section of the display block from FIG. 5A, in accordance with an embodiment.

FIG. 5B is a cross section 525 of the display block 510 from FIG. 5A, in accordance with an embodiment. The electronic display panel 526 may be an OLED display that does not include a circular polarizer (e.g., a linear polarizer and quarter wave plate overlays the pixels of the display). In some cases, OLED displays contain a circular polarizer to help reduce environmental lighting from the display surface and increase contrast for the display. However, in some cases, a circular polarizer may not be included in the case when an OLED display is used in an HMD because the environmental light is already shielded from the user in the case of an HMD. The electronic display panel 526 includes a plurality of pixel groups 528. Each pixel group 528 includes a pixel 530, a black matrix 532, a linear polarizer 534, a specular reflector 536, and a quarter wave plate 538. The pixel 530 is formed on a substrate 539. The black matrix 532 separates the pixel 530 from adjacent pixels 530 in other pixel groups 528. In alternate embodiments, a pixel group may include different or additional elements (e.g., multiple pixels 530).

The linear polarizer 534 overlays the pixel 530. The linear polarizer 534 linearly polarizes the light emitted from the pixel 530. The polarizer is oriented such that the linearly polarized light is oriented in a first direction. The linear polarizer 534 may be, e.g., an absorptive polarizer, thin film polarizer, or some other type of polarizer that linearly polarizes light.

The specular reflector 536 reflects incident light. The specular reflector 536 is a material (e.g., aluminum, silver) that reflects light at a wavelength emitted by the pixel 530. The specular reflector 536 overlays the black matrix 532 of the electronic display panel 526.

The curved reflective polarizer 540 is similar to the one in FIG. 5A, and is positioned to receive light emitted from the electronic display panel 526. Likewise, the quarter wave plate 538 is similar to the one described in FIG. 5A.

Figure 5C:
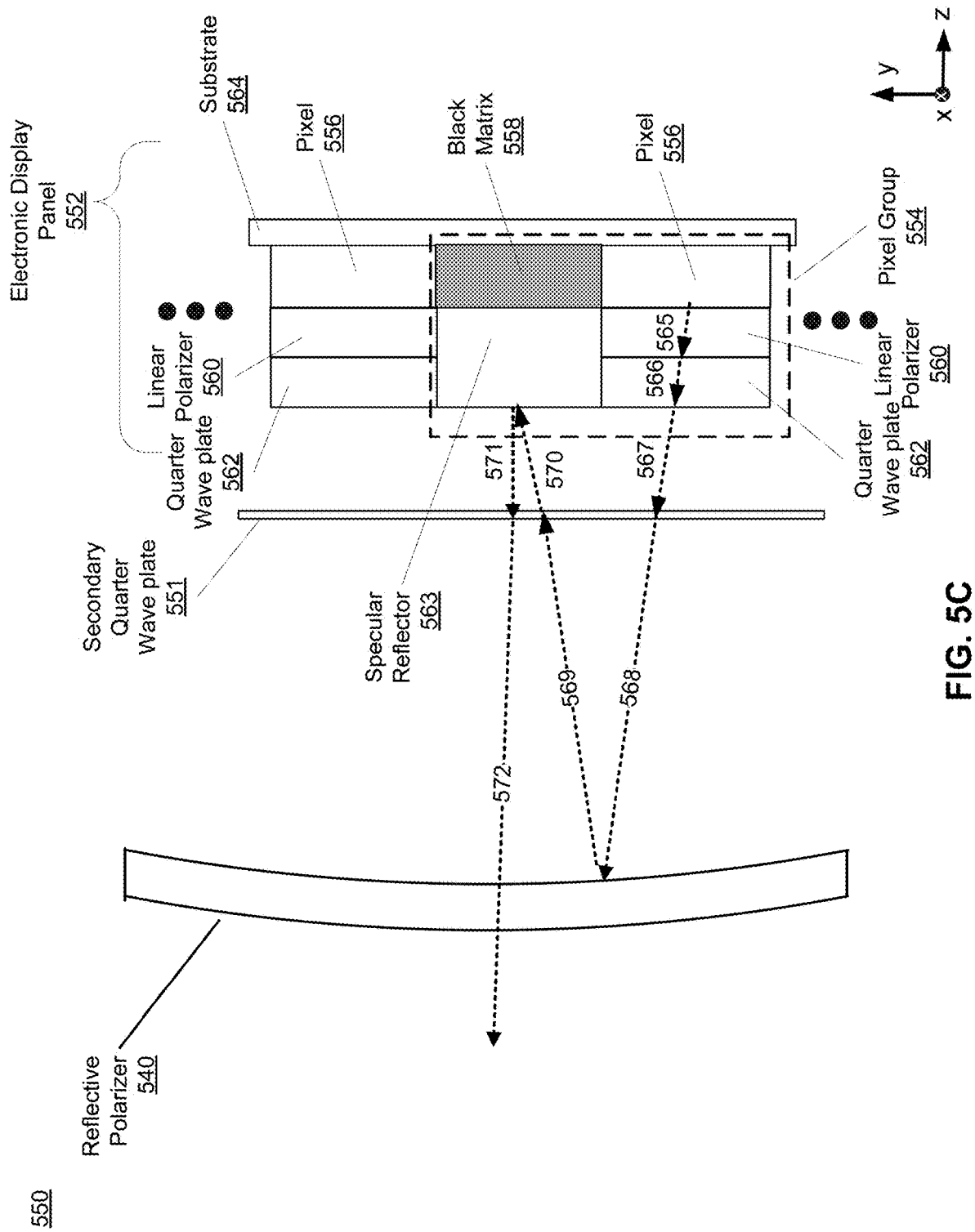
FIG. 5C is a cross section of the display block from FIG. 5A including a secondary quarter wave plate, in accordance with an embodiment.

For a given pixel group 528, light 541 emitted from a pixel 530 is linearly polarized in a first direction by the linear polarizer 534. This linearly polarized light 542 is incident on the curved reflective polarizer 540 and is reflected back towards the electronic display panel 526 because the first direction is orthogonal to a transmission axis of the reflective polarizer 540. A portion of the reflected light 543 is incident on the quarter wave plate 538. The light 544 travels through the quarter wave plate 538 and exits as circularly polarized light of a particular handedness (e.g., clockwise). The circularly polarized light reflects off of the specular reflector 536 and become circularly polarized light 545 of an opposite handedness (e.g., counterclockwise). The reflected light travels through the quarter wave plate 538 and exits the quarter wave plate 538 as linearly polarized light 546. The light 546 has a polarization orthogonal to the first direction, such that it aligns with the transmission axis of the reflective polarizer 540. The light 546 is transmitted by the reflective polarizer 540. FIG. 5C is a cross section 550 of the display block 510 including a secondary quarter wave plate 551, in accordance with an embodiment. The display block 510 includes a secondary quarter wave plate 551 that is between the electronic display panel 552 and the curved reflective polarizer 540. The curved reflective polarizer 540 is similar to the one in FIG. 5A. Although shown as flat, the secondary quarter wave plate 551 can be curved. The electronic display panel 552 includes a plurality of pixel groups 554. The pixel groups 554 include a pixel 556, a black matrix 558, a linear polarizer 560, a quarter wave plate 562, and a specular reflector 563. The pixel 556 is formed on the substrate 564. The black matrix 558 separates the pixel 556 from adjacent pixels 556 in other pixel groups 554. In alternate embodiments, a pixel group may include different or additional elements (e.g., multiple pixels 556).

The linear polarizer 560 and quarter wave plate 562 together form a circular polarizer, that overlays the pixels 556, and the specular reflector 563 overlays the black matrix 558. Although shown as part of the electronic display panel 552, the circular polarizer and the specular reflector 563 may be separate from the electronic display panel 552. Although the specular reflector 563 is shown as a separate layer in FIG. 5C, the black matrix 558 may be a specular reflector, and it may be the same layer.

For a given pixel group 554, light 565 emitted from a pixel 556 is linearly polarized in a first direction by the linear polarizer 560, and quarter waveplate 562 converts the linearly polarized light 566 to circularly polarized light 567. The circularly polarized light 567 travels through the secondary quarter wave plate 551 and becomes linearly polarized light 568 in the first direction. The light 568 is reflected by the reflective polarizer 540 because the first direction is orthogonal to a transmission axis of the reflective polarizer. The secondary quarter wave plate 551 converts the linearly polarized light 569 to circularly polarized light 570. The circularly polarized light 570 has a particular handedness (e.g., clockwise or counterclockwise). A portion 571 of the circularly polarized light 570 is reflected by the specular reflector 556. The reflected light 571 is circularly polarized but the handedness is opposite that of 570. The reflected light travels through the secondary quarter wave plate 551 and exits the secondary quarter wave plate 551 as linearly polarized light 572. The light 572 has a polarization orthogonal to the first direction, such that it aligns with the transmission axis of the reflective polarizer 540. The light 572 is transmitted by the reflective polarizer 540.

Figure 5D:
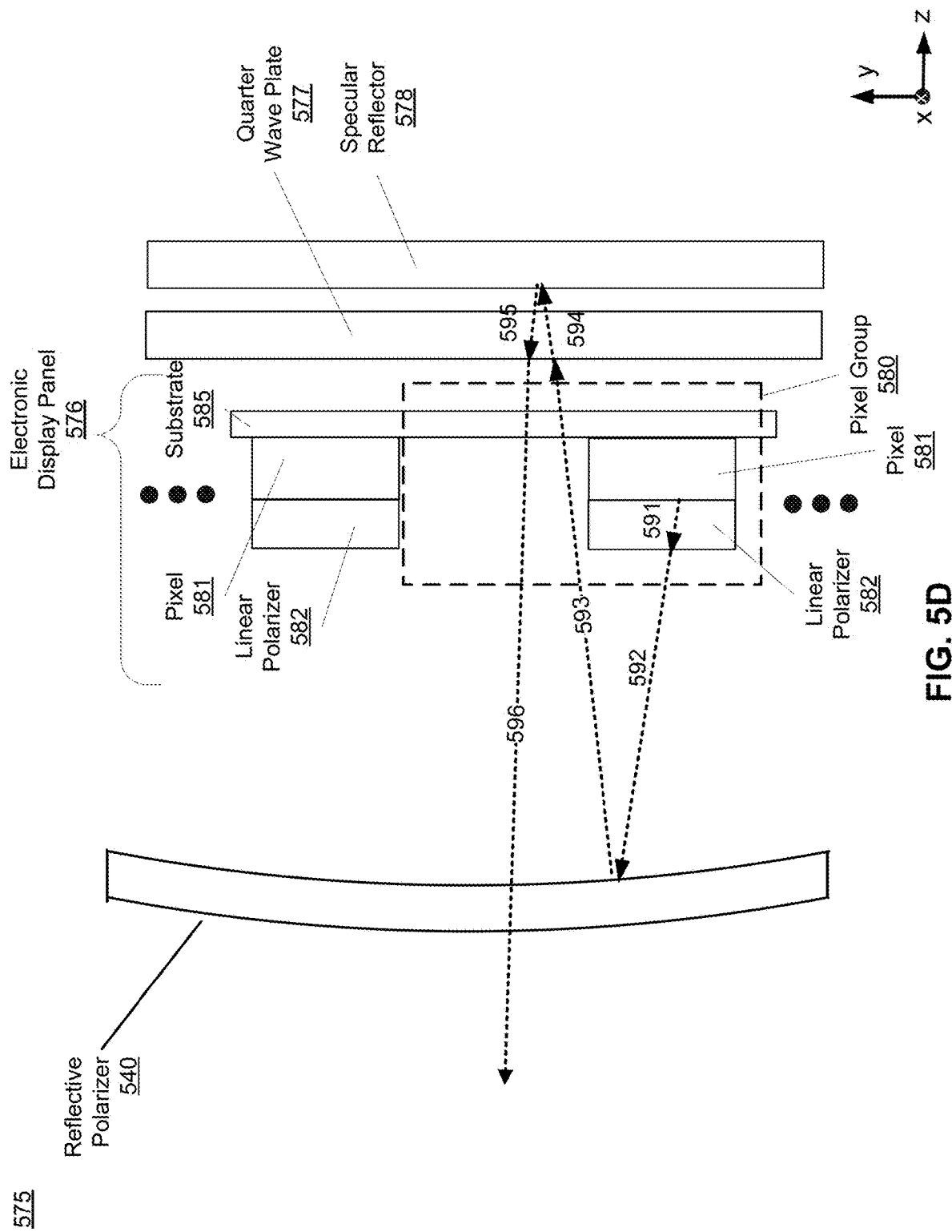
FIG. 5D is a cross section of the display block from FIG. 5A including a transparent electronic display panel, in accordance with an embodiment.

FIG. 5D is a cross section 575 of the display block 510 from FIG. 5A including a transparent electronic display panel 576, in accordance with an embodiment. In this embodiment, the electronic display panel 576 is a transparent display that is placed between a curved reflective polarizer 540 and a quarter wave plate 577. The quarter wave plate 577 overlays a specular reflector 578. The curved reflective polarizer 540 is similar to the one in FIG. 5A.

The electronic display panel 576 includes a plurality of pixel groups 580. The pixel groups include a pixel 581 and a linear polarizer 582. The linear polarizer 582 overlays the pixel 581 and does not overlay the regions in between pixels 581. The pixel 581 is formed on the substrate 585. The substrate 585, the pixel 580 and the linear polarizer 582 are substantially transparent.

For a given pixel group 580, light 591 emitted from a pixel 581 is linearly polarized in a first direction by the linear polarizer 582. This linearly polarized light 592 is incident on the reflective polarizer 540 and is reflected as light 593 because the first direction is orthogonal to a transmission axis of the reflective polarizer 540. The light 593 propagates through the transparent substrate 585 and is incident on the quarter wave plate 577. The light 594 travels through the quarter wave plate 577 and exits as circularly polarized light of a particular handedness (e.g., clockwise). The circularly polarized light reflects off of the specular reflector 578 and become circularly polarized light 595 of an opposite handedness (e.g., counterclockwise). The reflected light travels through the quarter wave plate 577 and exits the quarter wave plate 577 as linearly polarized light 596. The light 596 has a polarization orthogonal to the first direction, such that it aligns with the transmission axis of the reflective polarizer 540. The light 596 propagates through the substrate 585 and is transmitted by the reflective polarizer 540.

Some advantages of the embodiments of FIG. 5A-5D to correct for field curvature, as compared to the embodiment which will later be depicted in FIG. 6, include having more light throughput, especially if the pixel fill-factor is low. This is because light reflects off regions in between the pixels of the display panel and does not have to go through components such as a partially reflective mirror multiple times.

Figure 6:
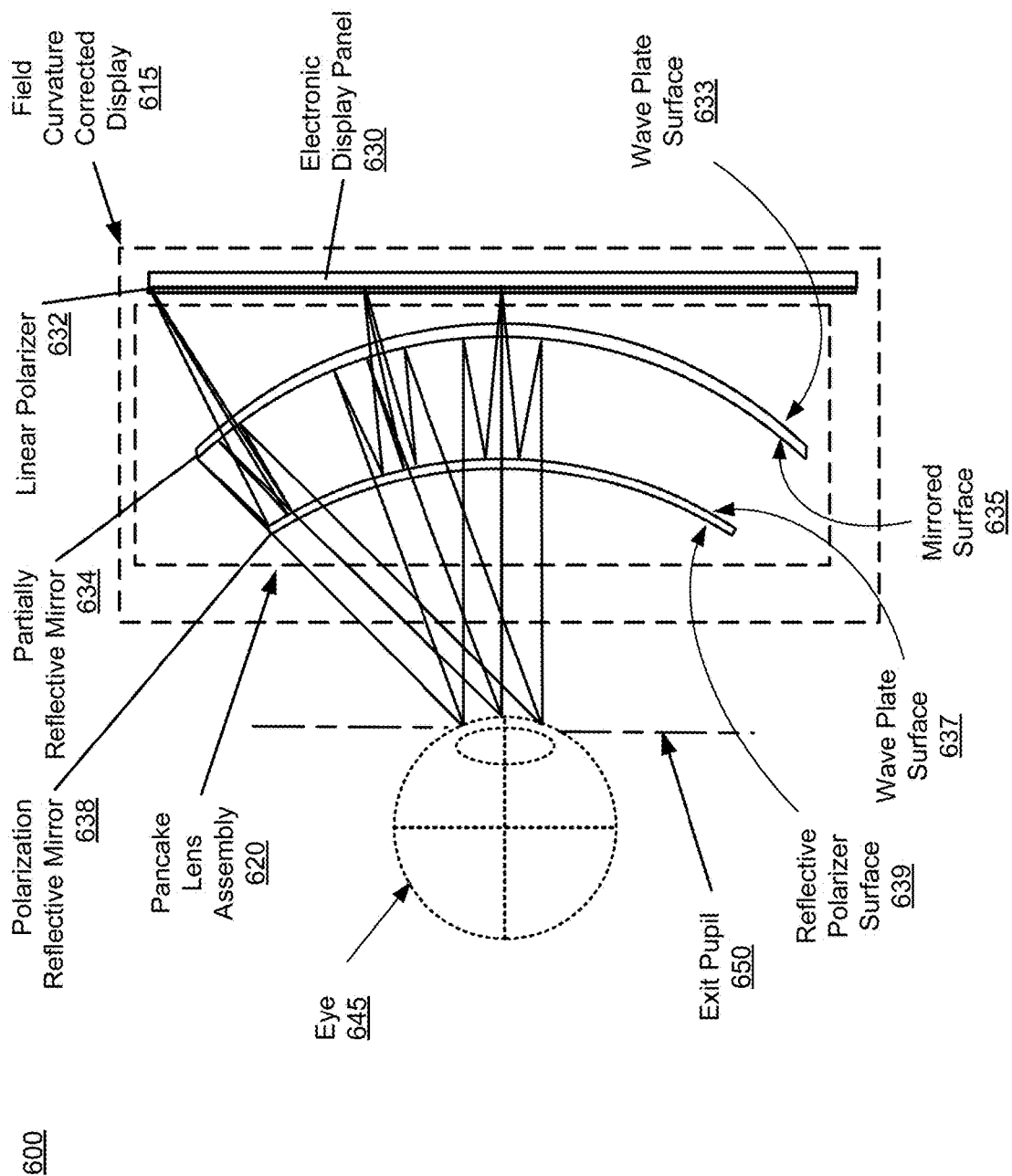
FIG. 6 is a cross section of a FC display, including a pancake lens assembly in accordance with an embodiment.

FIG. 6 is a cross section 600 of an embodiment of a FC display 615 that includes a pancake lens assembly 620, in accordance with an embodiment. In some embodiments, the FC display 615 is part of the FC display 115 of the VR headset 105. In other embodiments it is part of some other electronic display, e.g., AR display, HMD, VR display, digital microscope, etc. The FC display 615 is made of an electronic display panel 630, a polarizer 632, and a pancake lens assembly 620. The exit pupil 650 is the location where a user's eye 645 is positioned. For purposes of illustration, FIG. 6 shows a cross section 600 of a FC display 615 associated with a single eye 645, but another FC display, separate from the FC display 615, provides altered image light to another eye of the user. Some embodiments of the FC display 615 have different components than those described here. Similarly, in some cases, functions can be distributed among the components in a different manner than is described here.

The electronic display panel 630 is similar to the electronic display panel 330 of FIG. 3A. Although shown in FIG. 6 as separate from the electronic display panel 630, the linear polarizer 632 may be part of the electronic display panel 630. Light emitted from the electronic display panel 630 exits the display through the linear polarizer 632, resulting in light of one polarization.

The pancake lens assembly 620 includes a partially reflective mirror 634 and a polarization reflective mirror 638. In FIG. 6, the partially reflective mirror 634 is positioned close to the electronic display panel 630 and the polarization reflective mirror 638 is placed close to the user's eye 645. However, in some embodiments, the partially reflective mirror 634 may be positioned close to the user's eye 645, and the polarization reflective mirror 638 may be positioned close to the electronic display panel 630.

One or more surfaces of the partially reflective mirror 634 and the polarization reflective mirror 638 are shaped to correct for field curvature. One or more surfaces of the partially reflective mirror 634 may be shaped to be spherically concave (e.g., a portion of a sphere), spherically convex, a rotationally symmetric asphere, a freeform shape, or some other shape that mitigates field curvature. In some embodiments, the shape of one or more surfaces of the partially reflective mirror 634 and the polarization reflective mirror 638 are designed to additionally correct for other forms of optical aberration. In some embodiments, one or more of the optical elements within the pancake lens assembly 620 may have one or more coatings, such as anti-reflective coatings, to reduce ghost images and enhance contrast.

The partially reflective mirror 634 includes a wave plate surface 633 and a mirrored surface 635. The wave plate surface 633 is a quarter wave plate that shifts a polarization of received light. A quarter wave plate includes a polarization axis. The polarization axis is shifted 45 degrees relative to incident linearly polarized light such that the quarter wave plate converts linearly polarized light into circularly polarized light. Likewise, the quarter wave plate converts circularly polarized light to linearly polarized light. The mirrored surface 635 is a partially reflective mirror configured to reflect a portion of the received light. In some embodiments, the mirrored surface 635 is configured to transmit 50% of incident light and reflect 50% of incident light.

The polarization reflective mirror 638 includes a wave plate surface 637 and a reflective polarizer surface 639. The wave plate surface 637 is a quarter wave plate. The reflective polarizer surface 639 is a partially reflective mirror configured to reflect light of one polarization (blocking polarization) and transmit light of a second polarization (perpendicular polarization) of the received light. For example, the reflective polarizer surface 639 may be configured to reflect light that is linearly polarized in the x direction, and pass light that is linearly polarized in the y direction.

The pancake display assembly 620 mitigates field curvature and accordingly acts to reduce pupil swim. Additionally, the pancake display assembly 620 has a small form factor and relatively low weight compared to other optical systems designed to remove field curvature.

Light exiting the electronic display panel 630 is either inherently polarized, or becomes linearly polarized light in a first direction after traveling through linear polarizer 632. The linearly polarized light is incident on the wave plate surface 633, becoming circularly polarized light. A portion of the circularly polarized light passes through the mirrored surface 635 of the partially reflective mirror 634. This circularly polarized light passes through the wave plate surface 637, becoming linearly polarized in the first direction. The reflective polarizer surface 639 reflects this linearly polarized light because the first direction is orthogonal to a polarization axis of the reflective polarizer surface 639. The reflected light propagates back through the wave plate surface 637 and the light becomes circularly polarized. The circularly polarized light is incident on the mirrored surface 635. A portion of the circularly polarized light is reflected by the mirrored surface 635, becoming circularly polarized light with opposite handedness. The reflected circularly polarized light passes through the wave plate surface 637 to become linearly polarized light that is polarized in a second direction that is orthogonal to the first direction. The second direction aligns with the polarization axis of the reflective polarizer surface 639. The reflective polarizer surface 639 transmits the linearly polarized light to the user's eye 645.

Some advantages of this embodiment of using a pancake lens assembly to correct for field curvature include having a small form factor, low weight, and ability to use a flat display with this technique.

Figure 7A:
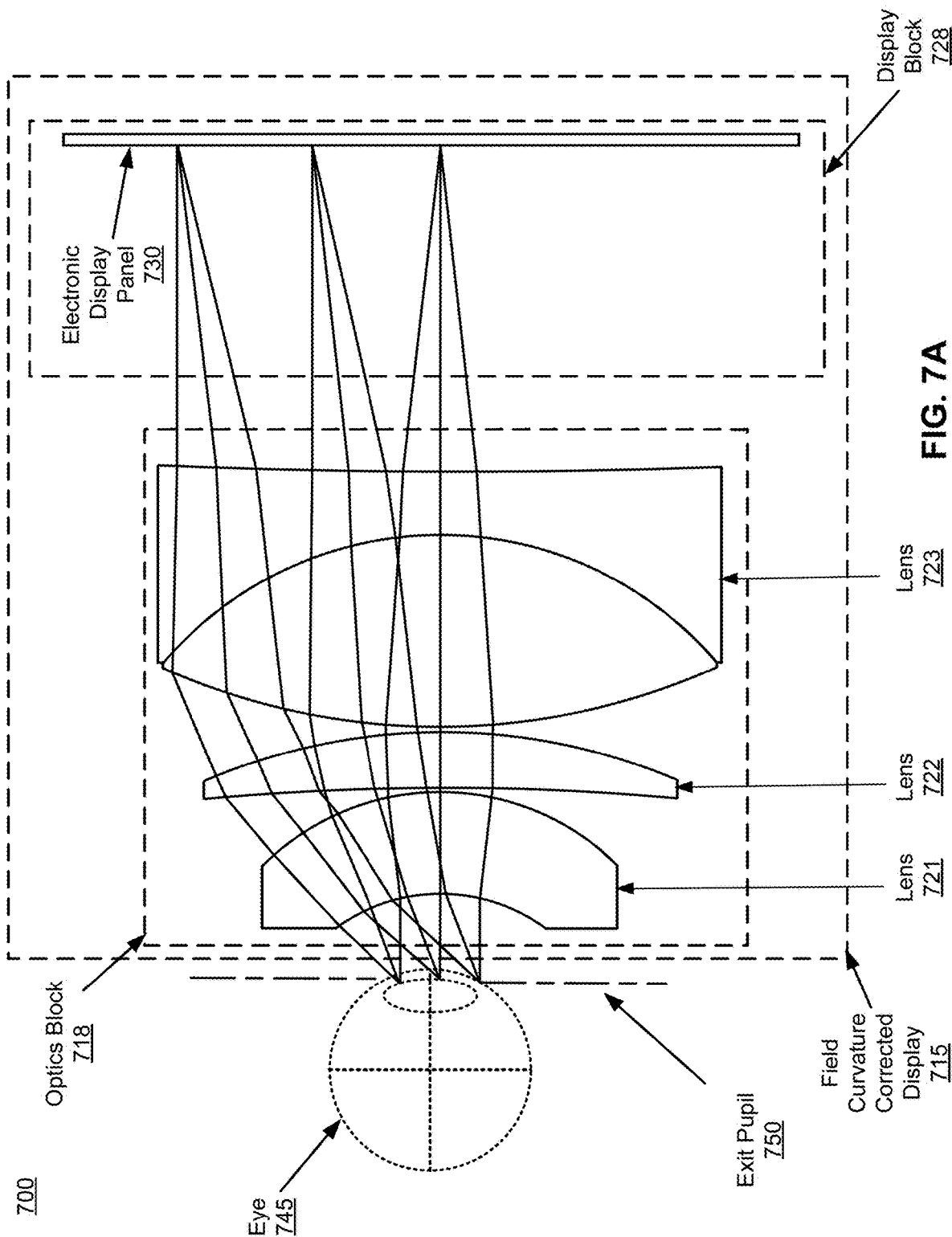
FIG. 7A is a cross section of a FC display including three lenses, in accordance with an embodiment.

FIG. 7A is a cross section 700 of another embodiment of a FC display 715 including three lenses, in accordance with an embodiment. In some embodiments, the FC display 715 is part of the FC display 115 of the VR headset 105. In other embodiments it is part of some other electronic display, e.g., AR display, HMD, VR display, digital microscope, etc. The FC display 715 includes a display block 728 and an optics block 718. The exit pupil 750 is the location where a user's eye 745 is positioned. For purposes of illustration, FIG. 7A shows a cross section of a FC display 715 associated with a single eye 745, but another FC display, separate from the FC display 715, provides altered image light to another eye of the user. Some embodiments of the FC display 715 have different components than those described here. Similarly, in some cases, functions can be distributed among the components in a different manner than is described here.

The display block 728 is made of an electronic display panel 730. The electronic display panel 730 is similar to the electronic display panel 330 of FIG. 3A.

The optics block 718 is similar to the optics block 318 of FIG. 3A. The optics block 718 contains three lenses, lens 721, lens 722 and lens 723. In this embodiment, the lens 723 is a compound lens that is shaped to be spherically concave (e.g., a portion of a sphere). However, in other embodiments, the lens 723 may be spherically convex, a rotationally symmetric sphere, a freeform shape, or some other shape that mitigates field curvature. In some embodiments, the shape of the lens 723 may designed to additionally correct for other forms of optical aberration. These lenses could be coupled by a lens holder, although not shown in the figure. The optics block magnifies received light from the display block 728 and corrects optical aberrations associated with the image light.

Figure 7B:
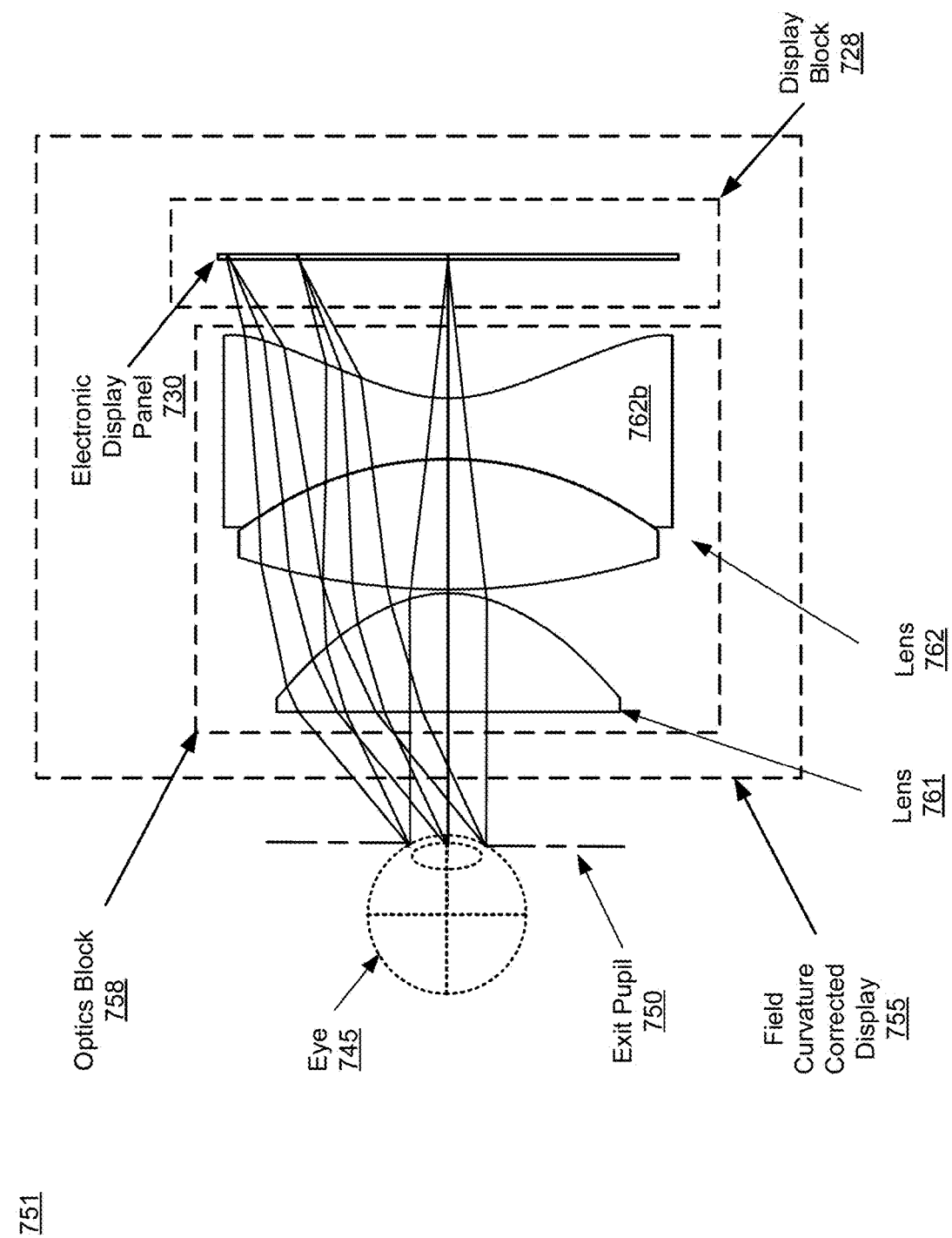
FIG. 7B is a cross section of a FC display including two lenses, in accordance with an embodiment.

FIG. 7B is a cross section 751 of another embodiment of a FC display 755 with two lenses, in accordance with an embodiment. In some embodiments, the FC display 755 is part of the FC display 115 of the VR headset 105. In other embodiments it is part of some other electronic display, e.g., AR display, HMD, VR display, digital microscope, etc. The FC display 755 includes a display block 728 and an optics block 758. The exit pupil 750 is the location where a user's eye 745 is positioned. For purposes of illustration, FIG. 7B shows a cross section of a FC display 755 associated with a single eye 745, but another FC display, separate from the FC display 755, provides altered image light to another eye of the user. Some embodiments of the FC display 755 have different components than those described here. Similarly, in some cases, functions can be distributed among the components in a different manner than is described here. In this embodiment, the optics block 758 is an all-plastic design, using two different kinds of plastic, and is a variation of the "reversed Kellner" eyepiece design. The optics block 758 includes two lenses, lens 761 and lens 762, and the lens 762 is a doublet. This design can provide a large field of view (80 degrees full field of view or larger) and reasonable eye relief.

In the embodiments depicted in FIG. 7A and FIG. 7B, at least one negative element is used to correct for field curvature. For example, in FIG. 7A, lens 721 and part of lens 723 are negative elements. In FIG. 7B, part 762b of lens 762 is a negative element. The lenses can be designed and fabricated with glass, plastic, or a combination of glass and plastic. Plastic may be preferred as a material due to its light weight and availability of low-cost fabrication methods. Using different materials with different dispersion parameters helps to correct for axial and lateral chromatic aberrations. The individual lens surfaces can be spheres, aspheres, or freeform surfaces.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A system comprising:
   a field curvature corrected (FC) display configured to correct for field curvature in an image that is output to an eye of a user of the system, the FC display comprising:
   a display block configured to output image light, the display block comprising:
   a projector and a diffuser, the diffuser configured to receive the image light from the projector, the diffuser having a shape configured to output the image light corrected for field curvature and corrected for an additional optical aberration; and
   an optics block configured to optically direct the image light corrected for field curvature to an exit pupil of the system corresponding to a location of the eye of the user of the system.

2. The system of claim 1, wherein the shape of the diffuser is configured to output the image light along a curved image plane that corresponds to a focal plane of the optics block.

3. The system of claim 1, wherein the diffuser is configured to diffuse the image light from the projector.

4. The system of claim 1, wherein the diffuser includes a reflective surface.

5. The system of claim 1, wherein the projector is positioned behind the diffuser relative to the eye of the user.

6. The system of claim 1, wherein the projector is positioned in front of the diffuser relative to the eye of the user.

7. The system of claim 1, wherein the projector is a laser projector.

8. The system of claim 1, wherein the projector is a pico projector.

9. The system of claim 1, wherein the projector includes a digital mirror device (DMD).

10. The system of claim 1, wherein the shape of the diffuser is spherically concave.

11. The system of claim 1, wherein the shape of the diffuser is spherically convex.

12. The system of claim 1, wherein the shape of the diffuser is a rotationally symmetric sphere.

13. The system of claim 1, wherein the shape of the diffuser is a freeform shape.

14. A system comprising:
   a projector configured to project image light;
   a curved diffuser configured to receive the image light and to diffuse the image light, the diffuser having a shape configured to output the image light corrected for field curvature and corrected for an additional optical aberration; and
   an optics block having a curved focal plane configured to optically direct the image light corrected for field curvature to an exit pupil of the system corresponding to a location of an eye of a user of the system.

15. The system of claim 14, wherein a grain size of the curved diffuser is an order of magnitude smaller than a pixel pitch of the projector.

16. The system of claim 14, wherein the shape of the curved diffuser is configured to output the image light along a curved image plane that corresponds to the curved focal plane of the optics block to correct for the field curvature.

17. The system of claim 14, wherein the curved diffuser includes a reflective surface.

18. The system of claim 14, wherein the projector is a laser projector, a pico projector, or a projector that includes a digital mirror device (DMD).

19. A system comprising:
   a field curvature corrected (FC) display configured to correct for field curvature in an image that is output to an eye of a user of the system, the FC display comprising:
   a display block configured to output image light, the display block comprising:
   a projector and a diffuser, the diffuser configured to receive the image light from the projector, the diffuser having a shape configured to output the image light corrected for field curvature, and a grain size of the diffuser is an order of magnitude smaller than a pixel pitch of the projector; and
   an optics block configured to optically direct the image light corrected for field curvature to an exit pupil of the system corresponding to a location of the eye of the user of the system.

20. A system comprising:
   a projector configured to project image light;

a curved diffuser configured to receive the image light and to diffuse the image light, and a grain size of the diffuser is an order of magnitude smaller than a pixel pitch of the projector; and an optics block having a curved focal plane configured to optically direct the image light corrected for field curvature to an exit pupil of the system corresponding to a location of an eye of a user of the system.

\* \* \* \* \*